United States Patent Office 3,167,499
Patented Jan. 26, 1965

3,167,499
HYDROCATALYTIC DESULFURIZATION OF HYDROCARBONS
John Norman Haresnape and Peter Thomas White, both of Sunbury-on-Thames, England, assignors to The British Petroleum Company Limited, London, England, a British joint-stock corporation
No Drawing. Filed Oct. 24, 1961, Ser. No. 147,184
Claims priority, application Great Britain Oct. 28, 1960
10 Claims. (Cl. 208—216)

This invention relates to the catalytic treatment of hydrocarbon feedstocks, for example those of petroleum origin. In particular it relates to treatment under conditions in which at least a portion of the feedstock is in the liquid phase.

Various catalytic processes for the treatment of petroleum feedstocks, particularly those boiling in the gas oil range and above, are in use or have been proposed, for example hydrocatalytic desulfurization catalytic cracking, hydrogenation, hydrocatalytic cracking, and isomerization. Normally these treatments use a fixed bed of pelleted or granular catalyst particles characterized by a relatively high specific surface area as measured by nitrogen adsorption, but a relatively low geometric surface area in relation to the volume of catalyst. Particularly when the feedstock is partly in the liquid phase and contains relatively large molecules diffusion into the body of the catalyst is difficult and only a small proportion of the catalyst (i.e., only the outer surface) is in effective contact with the feedstock. In addition diffusion is further hindered as the treatment progresses by carbonaceous deposits blocking the pores.

One possible solution to the problem is to reduce the size of the particles and so increase the ratio of surface to volume. However, as particle size decreases the catalyst bed becomes more closely packed and free flow of the reactants is hindered. It is necessary, therefore, to resort eventually to some form of fluidization with all its concomitant problems.

The present invention is concerned with an alternative solution to the problem in which a fixed bed of catalyst is used. The amount of catalyst material is appreciably reduced as compared with an equivalent conventional fixed bed process but this catalyst material is made available in a form in which there is a high utilization efficiency.

According to the present invention a process for the catalytic treatment of hydrocarbon feedstocks comprises bringing the feedstock into contact with a fixed bed of catalyst formed of a layer of catalyst material supported on a matrix the material of which is substantially devoid of pores with diameters below 1 micron, the ratio of weight of catalyst material to weight of total catalyst being less than $$\frac{\phi}{9(1-\phi)}$$

where $\phi$ is the ratio of the volume of voids in the catalyst bed greater than 1 micron diameter to the total volume of the reactor. The total volume of the reactor is defined as the volume of that section of the reactor which contains the catalyst bed.

For the purposes of the present invention, the weight of catalyst material means the total weight of the layer. This layer may in certain circumstances, be a metal or a metal sulfide, for example, nickel and/or tungsten sulfides, but preferably it consists of an active refractory oxide desirably containing other catalyst components, according to the particular process being used. The total catalyst consists of the catalyst material and the matrix. Preferably the ratio of the weight of catalyst material to weight of total catalyst is at least 0.005 and a particularly preferred range is from 0.1 to 0.5.

The volume of voids in the catalyst bed greater than 1 micron diameter may be measured by mercury penetration the pressure required to fill these voids being 180 p.s.i.a. Measurement of voids by mercury penetration may be made with a mercury porosimeter as described for, example, in Industrial and Engineering Chemistry, Analytical Edition, December 1954, at page 752. Preferably the volume of voids greater than 1 micron is not less than 30% and not more than 90% of the total volume of the reactor.

As with all catalyst beds, it is clearly necessary for the catalyst material and the voids to be substantially uniformly distributed throughout the catalyst bed. If a quantitative criterion is required for substantially uniform distribution this may be, for example, that on dividing the catalyst bed up into, for example, ten equal sections the amount of catalyst material and voids in any section does not vary by more than 20% from the amount in any other section. Since with a large reactor it may not be practicable to use a mercury penetration method over the whole of the bed, the bed may similarly be sampled to determine the volume of voids in representative portions of the bed. Alternatively a small bench or pilot plant scale reactor may be used containing a bed of the same catalyst as that used in a larger reactor. The volume of voids so determined can then be scaled up to the larger reactor. Also as with all fixed beds of catalysts there should be an adequate permeability to allow free flow of reactants and avoid high pressure drops through the bed. The requirements for the present beds of catalysts will be the same as for the conventional fixed beds of pelleted or granular catalysts.

From the foregoing it will be apparent that the invention envisages a type of catalyst in which there is a relatively low weight ratio of catalyst material to total catalyst weight, as compared with conventional beds of catalysts in which the particles consist wholly of catalyst material and in which the ratio is therefore 1. However, by forming this catalyst material as a layer on a matrix and ensuring that the volume of voids in the catalyst bed greater than 1 micron is a high percentage of the total reactor volume, a high percentage of the catalyst material can be readily reached by the feedstock, even when the feedstock is in the liquid phase.

A variety of matrices may be used in the process of the present invention and since the matrix is not in contact with the feedstock it need not have any catalytic properties and it may be formed of any convenient material having the necessary strength and the ability to withstand the temperatures used in the process. By way of illustration the material may be a metal, for example, aluminium, or refractory oxide, for example alpha-alumina or poreclain. The physical form of the matrix may also be varied, but preferably the matrix has a skeletal or sponge-like structure characterized by a high proportion of voids with mean diameters or distances between opposing surfaces of the voids of at least 1 micron. Examples of such matrices are a mass of wires, wire gauze, an assembly of rods or tubes or spirally wound strips of corrugated or knurled sheet material. Preferably two sheets are of sheet material wound together, one corrugated or knurled and the other either plain or corrugated or knurled to a different pitch. Such packs form cylinders with a large number of tubes running parallel to the vertical axis of the cylinder and are placed in a reactor with the vertical axis parallel to the direction of flow of the reactants. Other examples are sintered materials and skeletal or sponge-like refractory oxides, for example a commercially available alumina usually containing a minor amount of silica and in which the alumina is in the $\alpha$-form. The size of the voids in such aluminas are usually in the range 1–200$\mu$ diameter. Suitable matrices may also be prepared by leaching out one component from a two component mixture mixture in a manner similar, for example, to the preparation of Raney nickel. Non-skeletal types of matrices which may be suitable include annular particles for example eyelets.

As stated above, the catalyst material may comprise an active refractory oxide. Such materials are well known in the petroleum art and may be one or more oxides selected from Groups II, III and IV of the Periodic Table, for example beryllia, magnesia, boria, alumina, silica, titania or zirconia. Particularly preferred refractory oxides are alumina, preferably gamma or eta alumina, silica and silica-alumina. The refractory oxide may be the active catalytic material itself as for example in the case of a silica-alumina layer for catalytic cracking catalysts, or it may contain on or within it other catalytic elements or compounds depending on the process for which the catalyst is to be used. For example, in the case of hydrocatalytic processes it may contain one or more elements or compounds of elements having hydrogenating/dehydrogenating activity selected from Groups VIa or VIII of the Periodic Table, for example chromium, molybdenum, tungsten, the iron group metals and the platinum group metals. The amount of these materials may be from 0.1 to 25% wt. (expressed as the element) by weight of the refractory oxide.

Other catalytic elements which may be present are halogens, particularly chlorine and/or fluorine, and phosphorus, suitable amounts for these elements being from 0.1 to 15% wt. by weight of the refractory oxide.

Since the ratio of the weight of catalyst material to weight of total catalyst must be less than $\theta/9(1-\theta)$ (where $\theta$ is the fractional voidage as defined above) the layer of catalyst material will in consequence be relatively thin and will normally be of the order of 1 to 300µ thick. Although the volume of voids in the catalyst bed greater than 1 micron is preferably at least 30% of the total reactor volume (that is, the adjacent surfaces of layers are for the most part at least 1 micron apart) the layer itself may have a high proportion of small pores and a high surface area, as is normal for conventional pelleted catalyst. The specific surface area of the layer (as measured by low temperature nitrogen adsorption) may, for example, be from 100 to 500 m.²/g.

When the matrix consists of aluminium metal the existing oxide layer may be used as the surface layer. Alternatively a thicker surface layer of aluminium oxide may be formed by further oxidizing the metal for example by anodizing, or by reacting the metal with water or dilute acid, if necessary in the presence of an activator such as mercury, drying and calcining. Catalytic metals and compounds may be added subsequently by known impregnation techniques. Alternatively the surface layer may be added to the matrix by, for example, one of the following methods:

(a) Contacting with an alumina hydrogel (or silica-alumina or silica hydrogel) with or without soluble metals salts.

(b) Contacting with a soluble aluminium salt such as aluminium chloride, aluminium nitrate, aluminium sulphate followed by precipitation of the alumina in situ with ammonium hydroxide, washing, drying, calcination, and impregnation with metal salts from solution.

(c) Contacting with aluminium halide vapour, followed by steam treatment to form alumina and impregnation with metal salts from solution.

(d) Electrolytic deposition of aluminium using the matrix as the cathode followed by oxidation to alumina and impregnation with solutions of soluble metal salts.

Other methods known in the catalyst preparation art for the forming of thin films of catalyst material on inert supports may also be used. As stated above the present invention is particularly suitable for the treatment of petroleum feedstocks in which at least a portion and preferably at least 50% vol., of the feedstock is in the liquid phase. It could be used, for example, for a predominantly liquid phase gasoline treatment process such as low temperature selective hydrogenation, but it is particularly suitable for the catalytic treatment and more particularly the hydrocatalytic treatment of feedstocks boiling in the gas oil boiling range and above, including atmospheric and vacuum residues, that is feedstocks boiling above 150° C., and preferably above 250° C. One example of a suitable process is the hydrocatalytic desulfurization of crude oils and residues, which has not hitherto been found economically attractive with conventional catalysts.

The process conditions for the hydrocatalytic desulfurization may be essentially the same as for those using conventional catalysts viz.:

Temperature 550 to 900° F., preferably 600 to 800° F.
Pressure 15 to 3000 p.s.i.g., preferably 100 to 1000 p.s.i.g.
Gas rate (once-through or recycle) 50 to 4000 s.c.f./b., preferably 1000–2000 s.c.f./b.

However, to obtain an effect similar to that obtained when using a conventional catalyst the liquid hourly space velocity may be considerably higher, and may be for example from 10 to 150 wt. of feedstock/wt. of catalyst material/hour.

A particularly preferred catalyst material is a layer of cobalt and molybdenum oxides (as such or in combined form or both) on alumina, preferably from 1–10% wt. of cobalt oxide (expressed as CoO) and from 5–40% wt. of molybdenum oxide (expressed as $MoO_3$) by weight of catalyst material.

The invention is illustrated by the following examples:

Example 1

Aluminium turnings 0.004" thick x 0.03" wide were loosely rolled into balls of ½" diameter. These turnings were washed with carbon tetrachloride, dried, and treated with a mixture of dilute phosphoric and chromic acids at 180° F. for 30 minutes to clean the surface. The turnings were then washed, dried and heated in air at 550° C. for 2 hours. The turnings were next immersed in an alumina hydrogel (35 g. $Al_2O_3$/litre), excess slurry was shaken off and the coated turnings were dried at 110° C. and then calcined at 550° C. for 2 hours. The coated turnings were then immersed for 1 minute in a solution of 74.5 g. ammonium molybdate and 39.5 g. cobalt nitrate in 135 ml. water. The impregnated, coated turnings were then dried at 110° C. and calcined at 550° C. for 2 hours. The final total catalyst contained 11 g. catalytic material/100 g. total catalyst.

Comparative tests were then carried out with the catalyst prepared according to the example and a conventional ⅛" x ⅛" pelleted catalyst of cobalt and molybdenum oxides supported on alumina. The results obtained with 320°–566° C. ASTM wax distillate feedstock are compared in the following table:

| Catalyst Type | Conventional pellets | As Example |
|---|---|---|
| Wt. of total catalyst _____g__ | 63 | 49 |
| Wt. of catalyst material_____g__ | 63 | 5.4 |
| Volume of voids >1µ_____ml__ | 34.5 | 60 |
| Volume of reactor_____ml__ | 75 | 75 |
| $\theta$ _____ | 0.46 | 0.8 |
| $\theta/9(1-\theta)$ _____ | 0.095 | 0.44 |
| Wt. catalyst material/wt. of total catalyst_____ | 1 | 0.11 |
| Reactor temperature_____° F__ | 780 | 780 |
| Reactor pressure_____p.s.i.g__ | 1,000 | 1,000 |
| Exit gas ($H_2$) flow rate_____s.c.f./b__ | 700 | 880 |
| Feedstock space velocity [1]_____ | 1.8 | 18.7 |
| Desulfurization_____percent__ | 77 | 71 |

[1] Wt. feed/wt. of catalyst material/hour.

Thus it can be seen that by employing a catalyst according to the invention a tenfold increase has been achieved in the amount of feedstock processed per unit weight of catalyst material when compared with a conventional catalyst. This increase is accomplished with only a slight decrease in the amount of desulfurization obtained.

*Example 2*

116 g. of 8–16 mesh BSS alpha-alumina (containing 11 percent silica and substantially devoid of pores $<1\mu$ and having a pore volume in pores $>1\mu$ of 0.34 ml./g.) were calcined at 550° C. for 2 hours, cooled and added to a fine slurry of an alumina hydrogel. The mixture was stirred and shaken under vacuum. The granular catalyst was separated by pouring the mixture on to a 16 mesh sieve, and was subsequently dried at 110° C. and calcined at 550° C. for 2 hours. The alpha-alumina base having a surface coating of gamma-alumina was immersed in a solution of 21.3 g. ammonium molybdate and 12.0 g. cobalt nitrate in 70 ml. of water. Excess solution was drained and the catalyst was dried at 110° C. and calcined at 550° C. for 2 hours. The final total catalyst contained 1 g. catalyst material/100 g. total catalyst.

The catalyst was then used to desulfurize the feedstock of Example 1 and the following results were obtained:

| | |
|---|---|
| Wt. of total catalyst _____ g__ | 92 |
| Wt. of catalyst material _____ g__ | 0.9 |
| Volume of voids $>1\mu$ _____ ml__ | 30 |
| Volume of reactor _____ ml__ | 75 |
| $\theta$ _____ | 0.4 |
| $\theta/9(1-\theta)$ _____ | 0.074 |
| Wt. of catalyst material/wt. of total catalyst _____ | 0.01 |
| Reactor temperature _____ °F__ | 780 |
| Reactor pressure _____ p.s.i.g__ | 1000 |
| Exit gas ($H_2$), flow rate _____ s.c.f./b__ | 850 |
| Feedstock space velocity [1] _____ | 105 |
| Desulfurization _____ percent__ | 80 |

[1] Wt. feed/wt. of catalyst material/hour.

We claim:

1. A process for the hydrocatalytic desulphurization of hydrocarbon feedstocks comprising bringing the feedstock into contact at elevated temperature and pressure with a fixed bed of catalyst formed of a layer of catalyst material supported on a porous matrix, the material of which is substantially devoid of pores with diameters below 1 micron, the ratio of the weight of catalyst material to weight of total catalyst being from 0.005 to 0.5, and the porosity of the bed being from 30 to 90% measured as the volume of voids greater than 1 micron diameter to the total volume of the reactor, said ratio and said porosity being related so that said ratio is less than $$\frac{\theta}{9(1-\theta)}$$

where theta is said porosity, said catalyst material being a film 1 to 300 microns thick and comprising an active refractory oxide and at least one element having hydrogenating/dehydrogenating activity selected from Groups VIa and VIII of the Periodic Table.

2. A process as claimed in claim 1 wherein the material of the matrix is a metal.
3. A process as claimed in claim 1 wherein the material of the matrix is a refractory oxide.
4. A process as claimed in claim 1 wherein the active refractory oxide is alumina.
5. A process as claimed in claim 1 in which at least a portion of the feedstock is in the liquid phase.
6. A process as claimed in claim 5 in which at least 50% by volume of the feedstock is in the liquid phase.
7. A process as claimed in claim 5 wherein the feedstock boils above 150° C. and preferably above 250° C.
8. A process as claimed in claim 7 which is operated at from 350 to 900° F. and from 15 to 3000 p.s.i.g.
9. A process as claimed in claim 1 wherein the active refractory oxide is silica.
10. A process as claimed in claim 1 wherein the active refractory oxide is silica-alumina.

References Cited in the file of this patent

UNITED STATES PATENTS

| | | |
|---|---|---|
| 1,889,388 | Smith _____ | Nov. 29, 1932 |
| 2,029,100 | Grosse _____ | Jan. 28, 1936 |
| 2,037,781 | Grosse _____ | Apr. 21, 1936 |
| 2,037,790 | Ipatieff _____ | Apr. 21, 1936 |
| 2,273,297 | Szayna _____ | Feb. 17, 1942 |
| 2,890,165 | Bendars et al. _____ | June 9, 1959 |
| 2,497,176 | Mason _____ | Feb. 14, 1960 |

UNITED STATES PATENT OFFICE
CERTIFICATE OF CORRECTION

Patent No. 3,167,499 January 26, 1965

John Norman Haresnape et al.

It is hereby certified that error appears in the above numbered patent requiring correction and that the said Letters Patent should read as corrected below.

Column 1, line 19, for "desulfurization" read -- desulphurisation, --; column 4, line 18, for "50 to 4000 s.c.f./b." read -- 500 to 4000 s.c.f./b. --.

Signed and sealed this 6th day of July 1965.

(SEAL)
Attest:

ERNEST W. SWIDER
Attesting Officer

EDWARD J. BRENNER
Commissioner of Patents